(12) United States Patent
Doninger et al.

(10) Patent No.: US 7,979,858 B2
(45) Date of Patent: Jul. 12, 2011

(54) SYSTEMS AND METHODS FOR EXECUTING A COMPUTER PROGRAM THAT EXECUTES MULTIPLE PROCESSES IN A MULTI-PROCESSOR ENVIRONMENT

(75) Inventors: Cheryl G. Doninger, Cary, NC (US); David G. Horton, Cary, NC (US)

(73) Assignee: SAS Institute Inc., Cary, NC (US)

( * ) Notice: Subject to any disclaimer, the term of this patent is extended or adjusted under 35 U.S.C. 154(b) by 1285 days.

(21) Appl. No.: 11/542,674

(22) Filed: Oct. 3, 2006

(65) Prior Publication Data
US 2008/0092140 A1 Apr. 17, 2008

(51) Int. Cl.
*G06F 9/46* (2006.01)
*G06F 15/16* (2006.01)

(52) U.S. Cl. ......... 718/101; 718/102; 709/200; 709/201

(58) Field of Classification Search .................. None
See application file for complete search history.

(56) References Cited

U.S. PATENT DOCUMENTS

| | | | |
|---|---|---|---|
| 6,597,956 B1 | 7/2003 | Aziz et al. | |
| 7,240,052 B2 * | 7/2007 | Sidlosky et al. | 1/1 |
| 7,278,142 B2 * | 10/2007 | Bandhole et al. | 718/104 |
| 7,409,482 B2 * | 8/2008 | Olsen et al. | 710/107 |
| 2003/0097399 A1 * | 5/2003 | Yuan et al. | 709/203 |
| 2004/0019624 A1 | 1/2004 | Sukegawa | |
| 2005/0060237 A1 | 3/2005 | Barsness et al. | |
| 2005/0283786 A1 * | 12/2005 | Dettinger et al. | 718/104 |
| 2006/0005181 A1 | 1/2006 | Fellenstein et al. | |
| 2006/0212595 A1 * | 9/2006 | Chen et al. | 709/232 |
| 2007/0198979 A1 * | 8/2007 | Dice et al. | 718/100 |

OTHER PUBLICATIONS

Jacob, Bart, "Grid computing: What are the key components?", Jun. 27, 2006, 8 pp., http://www-128.ibm.com/developerworks/grid/library/gr-overview.

"SAS/Connect® Software", 2 pp., http://support.sas.com/md/scalability/connect/index.html, Retrieved on Sep. 26, 2006.

\* cited by examiner

*Primary Examiner* — Emerson C Puente
*Assistant Examiner* — Adam Lee
(74) *Attorney, Agent, or Firm* — Jones Day

(57) ABSTRACT

Systems and methods are provided for executing a computer program that performs multiple processes in a multi-processor environment. A client computer may be used to execute a process manager software application for generating computer instructions that identify a plurality of the processes that may be run in parallel on separate processors. A metadata server may be used to store metadata that identifies whether the multi-processor environment is available to execute the plurality of processes. The computer program may be stored on a computer-readable medium and may be configured to execute on the client computer, and when executed by the client computer may cause the client computer to query the metadata server to determine if the multi-processor environment is available to execute the plurality of processes. The computer program may be further configured to use the computer instructions to cause the plurality of processes to be executed in the multi-processor environment. The computer instructions may enable the computer program to execute the plurality of processes in parallel.

17 Claims, 5 Drawing Sheets

SYSTEMS AND METHODS FOR EXECUTING A COMPUTER PROGRAM THAT EXECUTES MULTIPLE PROCESSES IN A MULTI-PROCESSOR ENVIRONMENT

FIELD

The technology described in this patent document relates generally to the use and management of computer resources for executing computer programs.

BACKGROUND

Computer grid architectures are available for distributing processing functions across multiple computers.

SUMMARY

In accordance with the teachings described herein, systems and methods are provided for executing a computer program that executes multiple processes in a multi-processor environment. A client computer may be used to execute a process manager software application for generating computer instructions that identify a plurality of the processes that may be run in parallel on separate processors. A metadata server may be used to store metadata that identifies whether the multi-processor environment is available to execute the plurality of processes. The computer program may be stored on a computer-readable medium and may be configured to execute on the client computer, and when executed by the client computer may cause the client computer to query the metadata server to determine if the multi-processor environment is available to execute the plurality of processes. The computer program may be further configured to use the computer instructions to cause the plurality of processes to be executed in the multi-processor environment. The computer instructions may enable the computer program to execute the plurality of processes in parallel.

DETAILED DESCRIPTION

Figure 1:
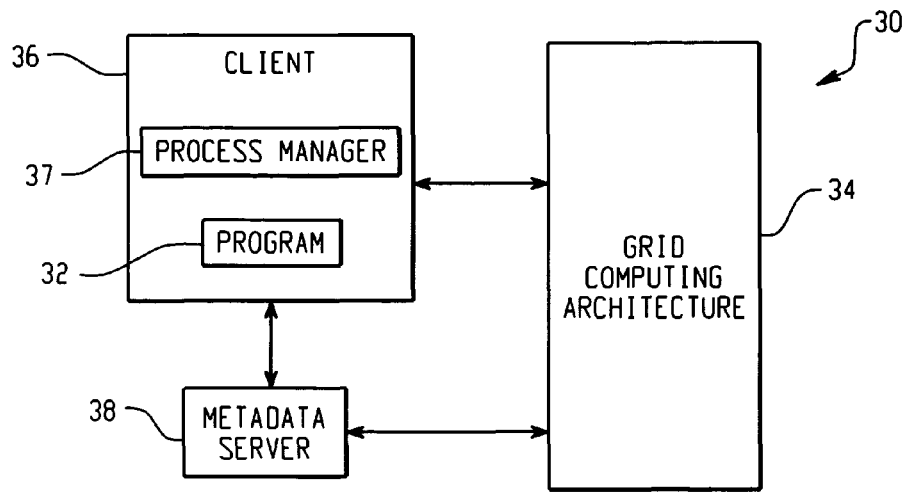
FIG. 1 is a block diagram depicting an example system for executing a computer program on a computer grid.

FIG. 1 is a block diagram depicting an example system 30 for executing a computer program 32 on a computer grid 34. The computer program 32 is stored in a computer-readable medium, such as a computer hard drive, and is executable by the client computer 36. Also stored on the computer-readable medium and executable by the client computer 36 is a process manager computer program 37. The system 30 also includes a metadata server 38 that is used by the client computer 36 to determine if the computer grid 34 is available for use in executing the computer program 32.

When executed by the client computer 36, the process manager computer program 37 is configured to identify two or more processes of the computer program 32 that may be run in parallel on different nodes of the computer grid 34. The process manager computer program 37 may also generate computer code that is used by the computer program 32 to identify the two or more processes. In one example, the process manager computer program 37 may provide a graphical user interface that enables a user to select processes to run in parallel on the computer grid. In another example, the process manager computer program 37 may be configured to automatically detect processes in the computer program 32 that can be run in parallel. Also, it should be understood that the process manager computer program 37 may either operate separately from the computer program 32 or could be integrated into the computer program 32. It should also be understood that in other embodiments, the computer code identifying the two or more processes that may be run in parallel may be created and added to the computer program 32 without the use of a process manager computer program 37.

When the computer program 32 is executed by the client computer 36, the computer program 32 causes the client computer 36 to query the metadata server 38 to determine if the computer grid 34 is available. For instance, metadata may be stored on the metadata server 38 that is used to indicate whether the computer grid 34 is available for use by the computer program 32. If the computer grid 34 is available, then the computer code generated by the process manager 37 is used by the computer program 32 to cause the identified two or more processes to be executed as separate jobs on the computer grid 34. In this manner, the computer grid 34 is able to execute the identified processes in parallel on different nodes of the computer grid, thereby reducing the necessary processing time. In addition, in certain embodiments, other processes of the computer program 36 may be run on the client computer 36, splitting the workload between the client computer 36 and the computer grid 34. Further, if it is determined from the metadata server 38 that the computer grid 34 is not available, then the computer program 32 may be sequentially executed by the client computer 36.

In one example, the client computer 36 may also have other parallel processing resources available to execute the computer program 32 in the event that the computer grid 34 is not available. For instance, the client computer 36 may include multiple processors that can be used to execute the computer program 32 or may have access to a computer with multiple processors. In this example, if the metadata server 38 indicates that the computer grid 34 is not available, then the computer program 32 may determine if a computer having multiple processors is available. If a computer with multiple processors is available, then the two or more processes identified by the process manager computer program 37 may be executed in parallel using the multiple processors. Otherwise, if neither the computer grid 34 nor a computer with multiple processors are available, then the computer program 32 may be sequentially executed using the client computer 36.

Figure 2:
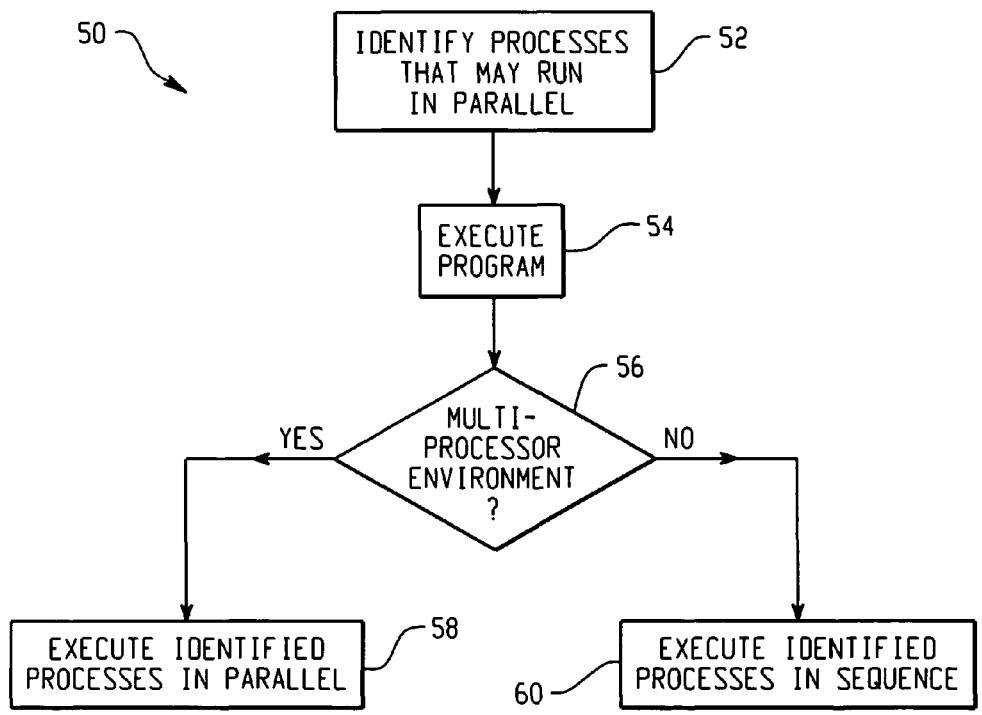
FIG. 2 is a flow diagram depicting an example method for executing a computer program in a multi-processor environment.

FIG. 2 is a flow diagram depicting an example method 50 for executing a computer program in a multi-processor environment. In step 52, the method identifies two or more processes of the computer program that may be run in parallel. The identified processes may, for example, be distinct operations that are performed by the computer program or could be different iterations of the same operation. For instance, iterations of the same operation may be run in parallel to provide load balancing for multiple users of the computer program.

The computer program is executed in step 54. The method 50 then determines at step 56 whether a multi-processor environment is available to execute the identified processes in parallel. A multi-processor environment could, for example, include a grid computing environment or a computer having multiple processors. If a multi-processor environment is available, then the method proceeds to step 58 and executes the identified processes in parallel. Otherwise, if no multi-processor environment is available, then the method executes the identified processes sequentially in step 60.

It should be understood that similar to the other processing flows described herein, one or more of the steps and the order in the flowchart may be altered, deleted, modified and/or augmented and still achieve the desired outcome.

Figure 3:
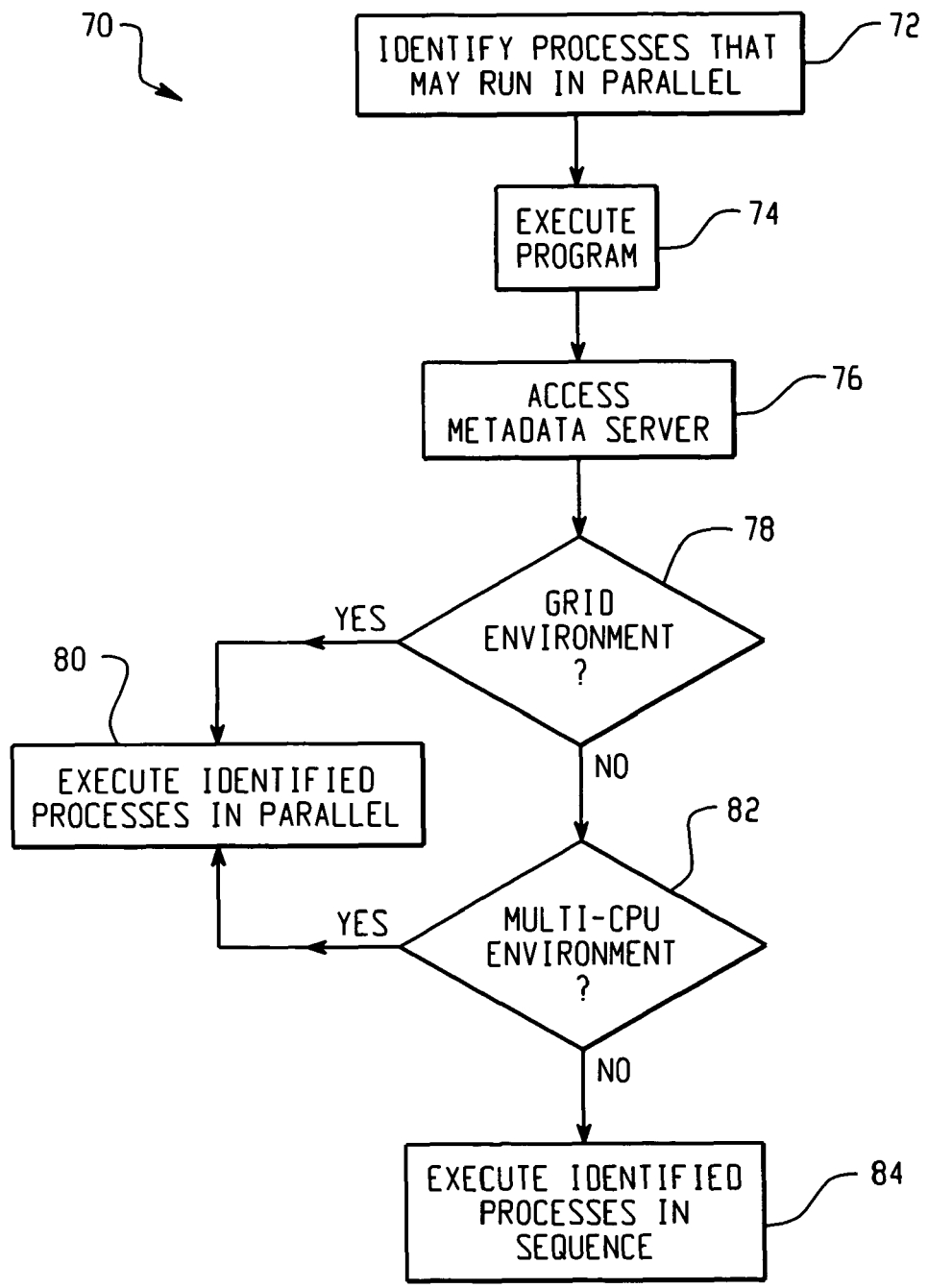
FIG. 3 is a flow diagram depicting another example method for executing a computer program in a multi-processor environment.

FIG. 3 is a flow diagram depicting another example method 70 for executing a computer program in a multi-processor environment. In step 72, the method identifies two or more processes of the computer program that may be run in parallel. The computer program is executed in step 74, and a metadata server is accessed by the computer program in step 76. In step 78, the metadata server is used to determine if a grid computing environment is available for parallel execution of the processes identified in step 72. If a grid computing environment is available, then the identified processes are executed in parallel by the grid computing environment at step 80. Otherwise, if a grid computing environment is not available, then the method proceeds to step 82.

In step 82, the method determines if a multi-processor computer is available to execute the identified processes. The availability of a multi-processor computer may, for example, be determined using the metadata server, or may be determined by another processing device such as a computer running the computer program. If a multi-processor computer is available, then the identified processes are executed in parallel using the multi-processor computer at step 80. Otherwise, if neither a grid computing environment nor a multi-processing computer are available, then the identified processes are executed sequentially at step 84.

Figure 4:
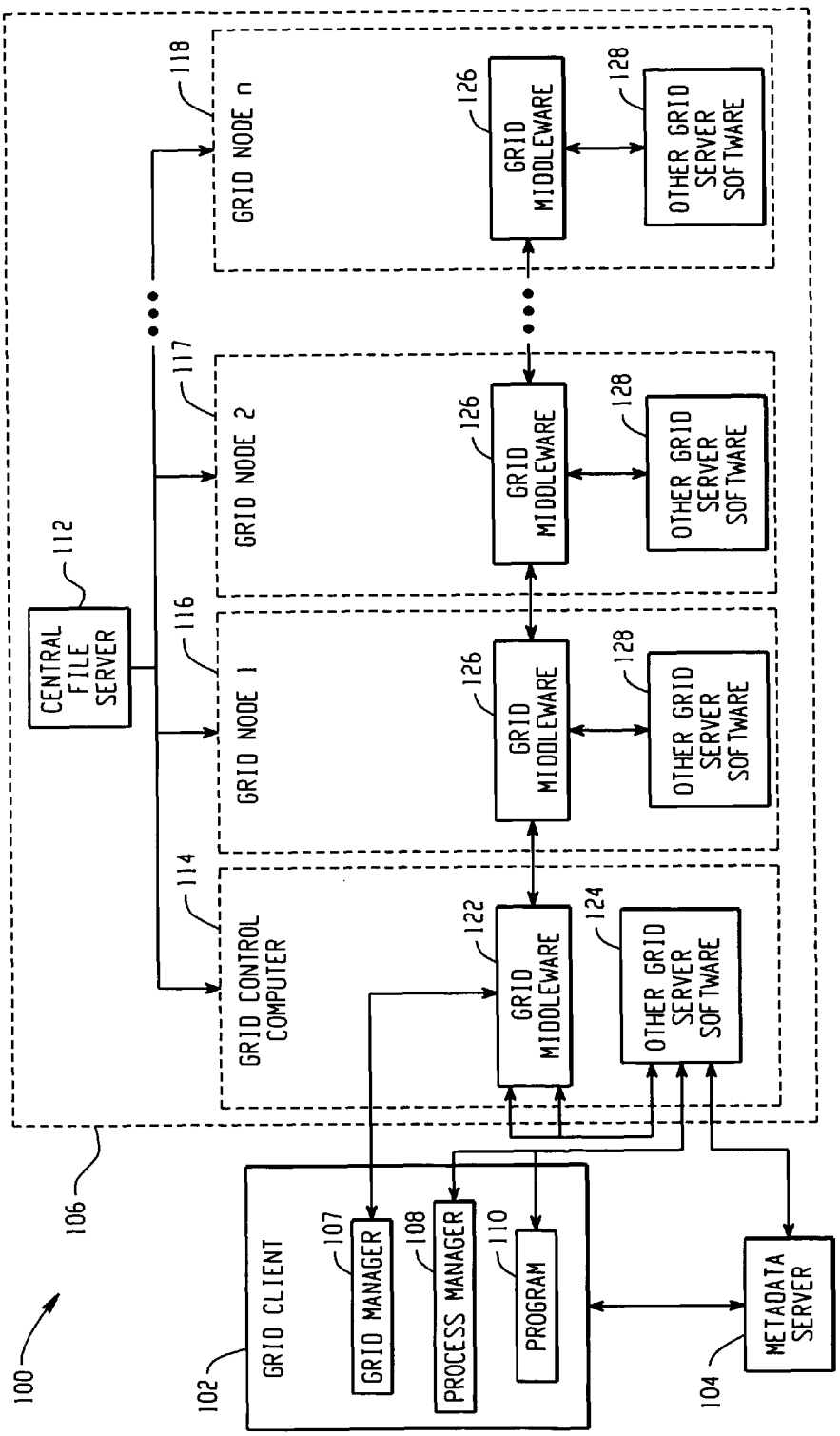
FIG. 4 is a block diagram depicting an example system for executing a computer program in a computer grid.

FIG. 4 is a block diagram depicting an example system 100 for executing a computer program 110 on a computer grid 106. The system 100 includes a client computer 102, a metadata server 104 and a computer grid 106. The client computer 102 is used to execute a grid manager computer program 107, a process manager computer program 108 and an application computer program 110, which are stored on one or more computer readable mediums located on, or accessible by, the client computer 102. The computer grid 106 includes a central file server 112, a grid control computer 114 and a plurality of grid node computers 116-118.

The grid management computer program 107 communicates with the grid control computer 114 to control the distribution of the processing workload to the grid node computers 116-118. The grid control computer 114 executes a grid middleware program 122, which may include grid manager software for monitoring and controlling resource allocation in the computer grid 106. For instance, the grid manager 107 and platform grid middleware 122 programs may be used to monitor which of the grid node computers 116-118 are being used to execute components of the application program 110 at any given time. The grid middleware program 122 is also used to perform load balancing and scheduling operations to control the distribution of processing functions across the grid 106. In one example, the grid middleware program 122 may be selected from the Platform LSF Family of Products sold by Platform Computing Inc. located in Markham, Ontario, Canada.

The grid control computer 114 may also execute other grid server software 124. The other grid server software 124 may include one or more other computer programs to enable database operations and control communications between computers in the grid 106. Various computer programs are presently available for enabling and controlling communications in a computer grid 106. For instance, if the computer grid 106 is configured to operate in a SAS environment, then the grid server software 124 may include Base SAS, SAS Connect, SAS Workplace Server, SAS Grid Server and SAS Data Step Batch Server software applications.

Similarly, each grid node computer 116-118 executes a grid middleware program 126, such as Platform LSF, to control the load balancing and scheduling operations. In addition, each grid node computer 116-118 executes one or more other grid server software applications 128 to enable database operations and to control communications between computers in the grid 106. For instance, in a SAS environment, the grid server applications 128 may include Base SAS, SAS/Connect, SAS Grid Server and SAS Data Step Batch Server software applications.

On the client computer 102, the process manager computer program 108 is configured to identify two or more processes of the application program 110 that may be run in parallel using different nodes of the computer grid 106. The process manager 108 may also generate computer code that is used by the computer program 32 to identify the two or more processes, without regard to specific grid resources. The process manager 108 may, for example, be implemented as part of the application program 110 or as a stand-alone computer program to enable the user to create a process workflow that identifies processes of the application program 110 to run in parallel. Example software applications that may be used to implement the process manager 108 to create process workflows for the grid include the ETL Studio and Enterprise Miner computer programs sold by SAS Institute, Inc. of Cary, N.C. Other process manager computer programs 108 could also be used. In addition, in some embodiments the application program 110 may be configured to identify the two or more processes that may be run in parallel without using a process manager program 108.

The application program 110, when executed, connects to the metadata server 104 to retrieve grid definition metadata. The grid definition metadata is used to indicate whether the computer grid 106 is available for use by the client computer 102, and may also identify other parameters or attributes of the computer grid 106. For instance, the grid definition metadata may identify which users are authorized to access the grid 106. In one example, the client computer 102 may determine that the computer grid 106 is not available if either the present user is not authorized to access the computer grid 106 or if grid definition metadata is not currently present in the metadata server 104.

If the grid 106 is available, then the computer code generated by the process manager 108 is used by the application program 110 to cause the grid client computer 102 to perform the identified parallel processing operations on the computer grid 106. Otherwise, if the grid 106 is not available to the grid client computer 102, then the operations of the database program 110 are performed using the sequential processing capabilities of the grid client computer 102. In addition, as the processes execute on the computer grid 106, the application program 110 may be configured to asynchronously aggregate the data generated by the processes, synchronize the data, and provide the synchronized data to one or more subsequent processes.

The computer code generated by the process manager 108 to identify processes that may be run in parallel may be added to the application program 110. In addition to identifying certain processes to run in parallel, the computer code may also provide other functionality to grid-enable the application program 110. For instance, the computer code may enable the program 110 to turn grid functionality on and off. This may include the ability to enable grid processing for an entire code stream, or to enable grid processing for some processes but not for others. In addition, the computer code may be used to perform other grid processing functions, such as retrieving the name and/or network address of a grid computer or querying the number of grid computers that are available for parallel execution of the program 110. Following are examples of computer code that may be generated to grid enable the application program 110. These examples are specific to a computer program that executes in a base SAS environment, and are included only as non-limiting examples.

Example 1 grdsvc_enable(identifier, resource, workload)

This example function may be used to identify processes of a SAS application that may be run in parallel on a computer grid. The "identifier" parameter provides the remote session "id." The "resource" parameter provides the ServerContext to be accessed to look up the logical grid server and the properties defined in the grid server component. The "workload" parameter is optional and indicates the type of workload to be distributed on the computer grid. The output of this function is a return code. A non-zero return code indicates that a distributed grid environment is not available and SMP execution is assumed. The processes will not be executed on the computer grid if any of the following are true, indicating that the computer grid is not available: 1) the grid metadata on the metadata server 38 has not been defined; or 2) the current user does not have authorization to access the metadata on the grid metadata server 38. The "grdsvc_enable" function can be called either through the % sysfunc macro call or within a SAS data step as follows:

```
%let var=%sysfunc(grdsvc_enable(identifier, options));
        OR
data _null_;
    var=grdsvc_enable("identifier", "options");
run;
```

Following are four examples (A-D) of computer code utilizing the "grdsvc_enable" function.

A. The following example causes all processes to be executed by the computer grid.

```
%let rc=%sysfunc(grdsvc_enable(_all_, resource=SASMain);
```

B. The following example turns off grid functionality for all processes.

```
%let rc=%sysfunc(grdsvc_enable(_all_, "")
```

C. The following example causes process "p1" to be executed by the computer grid.

```
%let rc=%sysfunc(grdsvc_enable(p1, resource=SASMain);
```

D. The following example causes processes "p1," "p2," and "p4" to e executed on nodes in the computer grid that have the resource "SASMain" and that have been designated to handle workload of type "ETL." Process "p3" is assigned to a specified machine "aaa.bbb.ccc.com."

```
%let p1_rc=%sysfunc(grdsvc_enable(p1, resource=SASMain;
    workload=ETL);
%let p2_rc=%sysfunc(grdsvc_enable(p2, resource=SASMain;
    workload=ETL);
%let p4_rc=%sysfunc(grdsvc_enable(p4, resource=SASMain;
    workload=ETL);
%let p3=aaa.bbb.ccc.com;
signon p1;
signon p2;
signon p3 user=xxx pass=yyy;
signon p4;
```

Example 2 grdsvc_getname(identifier)

This example function may be used to identify the name of the grid node that was chosen to run a particular grid server session. The "identifier" parameter provides the remote session "id." The output of the function is the hostname of the grid machine that was chosen for the identified remote session "id." Following is an example of computer code utilizing the "grdsvc_getname" function. The function can be called either through the % sysfunc macro or within a SAS data step as follows:

```
%let var=%sysfunc(grdsvc_getname(identifier));
        OR
data _null_;
    var=grdsvc_getname("identifier");
run;
```

Example 3 grdsvc_getaddr(identifier)

This example function may be used to identify the ip address of the grid node that was chosen to run a particular grid server session. The "identifier" parameter provides the remote session "id." The output of the function is the ip address of the grid machine that was chosen for the identified remote session "id." Following is an example of computer code utilizing the "grdsvs_getaddr" function. The function can be called either through the % sysfunc macro or within a SAS data step as follows:

```
%let var=%sysfunc(grdsvc_getaddr(identifier));
        OR
data _null_;
    var=grdsvc_getaddr("identifier");
run;
```

Example 4 grdsvc_nnodes(resource)

This example function may be used to identify the number of grid processors available for parallel execution. The "resource" parameter provides the ServerContext that contains the grid logical server definition for the computer grid. The output of the function is the number of processors in the computer grid for parallel execution. This number does not represent "unused" vs. "busy" processors, but rather returns an indication of all of the processors in the computer grid. The function can be called either through the % sysfunc macro or within a SAS data step as follows:

```
%let var=%sysfunc(grdsvc_nnodes(resource=xxxx));
        OR
data_null_;
    var=grdsvc_nnodes("resource=xxxx");
run;
```

In another example, computer code may be generated that enables the client computer 102 to determine at run time how many processes to run in parallel on the grid 106 based on how many grid nodes 116-118 are currently available to execute the processes. For instance, if four processes have been identified as being able to run in parallel, but only three grid nodes are available, then the client computer 102 may be configured to run three of the identified processes in parallel using the available grid nodes and then subsequently run the forth process. In addition, the computer code may also instruct the client computer 102 to run a specific process on a specific machine, which may be either a grid node or a machine outside of the grid 106. Following is an example of computer code that may be generated to perform these functions. The example computer code is specific to a computer program that executes in a base SAS environment, and is included only as a non-limiting example.

```
%let rc=%sysfunc(grdsvc_enable(_all_,resource=SASMain));
%let rc=%sysfunc(grdsvc_enable(mvs, ""));
%let mvs=mvs1.abc.com;
signon mvs;
rsubmit;
libname dataloc 'sas';
proc download data=dataloc.sales;run;
endrsubmit;
%let nnodes=%sysfunc(grdsvc_nnodes("SASMain"));
%macro loop;
%do i=1 %to &nnodes;
signon gnode&i;
rsubmit wait=no;proc upload data=sales;run;endrsubmit;
%end;
%mend
```

Figure 5:
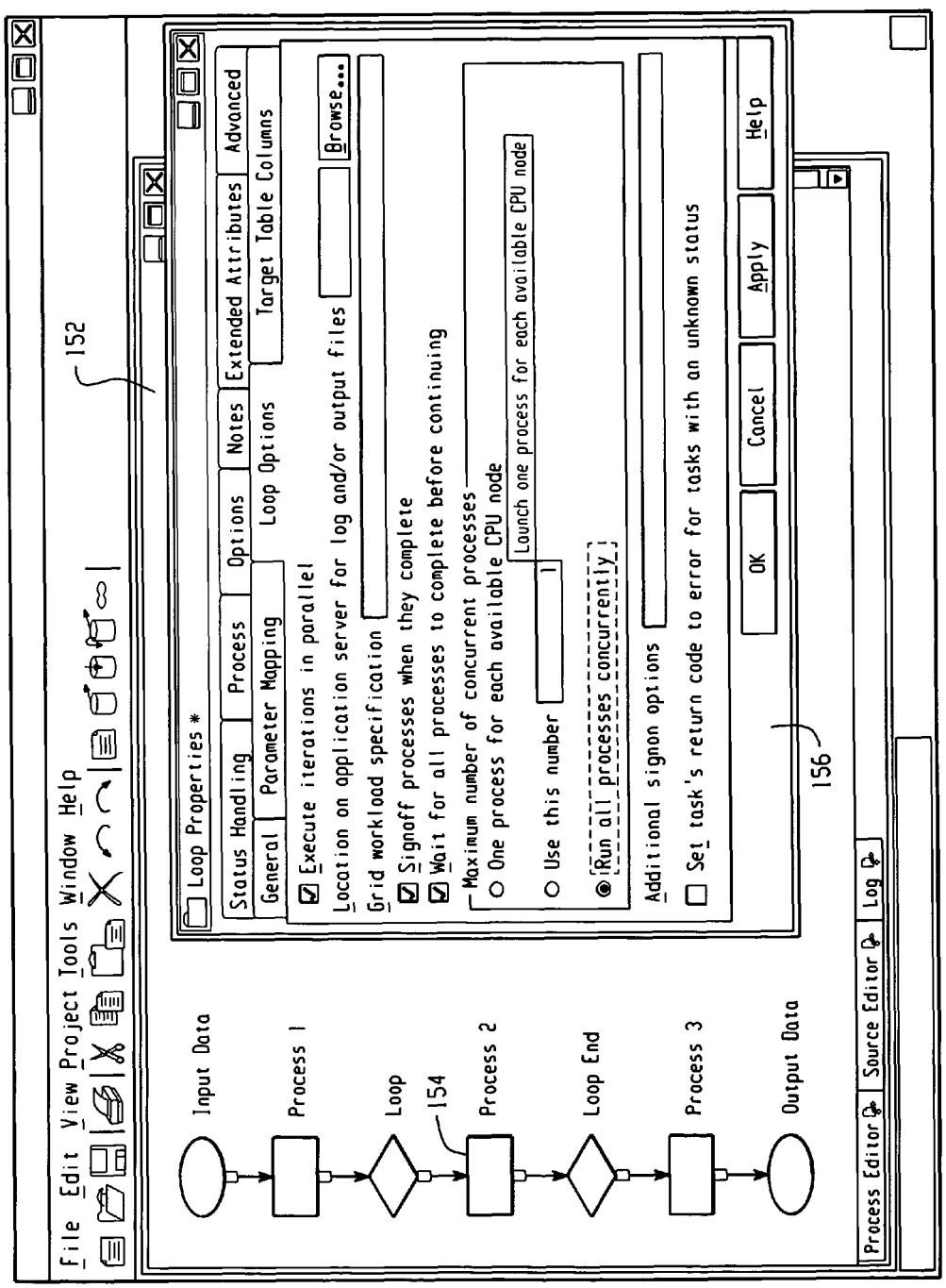
FIG. 5 depicts an example user interface for a process manager computer program.

FIG. 5 depicts an example user interface 150 for a process manager computer program that identifies processes of a computer program that may be run in parallel in a multi-processor environment. In this example, a process workflow diagram is displayed in a interface region 152, which may be used to modify and/or define properties of a process workflow for a computer program. The example process flow shown in FIG. 5 is a linear process that includes input data, followed by three processes (Process 1, Process 2 and Process 3) that generate output data. In addition, the illustrated process defines a loop operation that causes the computer program to perform multiple iterations of Process 2.

FIG. 5 also illustrates a second interface region 156 that is used to define the properties of the loop and to cause iterations of the process(es) within the loop (e.g., Process 2) to be executed in parallel by the multi-processor environment. In this example, the user may cause iterations of Process 2 to be run in parallel (provided that a multi-processor environment is available) by selecting the user interface box labeled "Execute iterations in parallel." Then, when the process flow is executed, computer code is generated that instructs the computer program to attempt to run iterations of the identified process (Process 2) in parallel using the multi-processor environment, for example as described above with reference to FIGS. 1-4.

Figure 6:
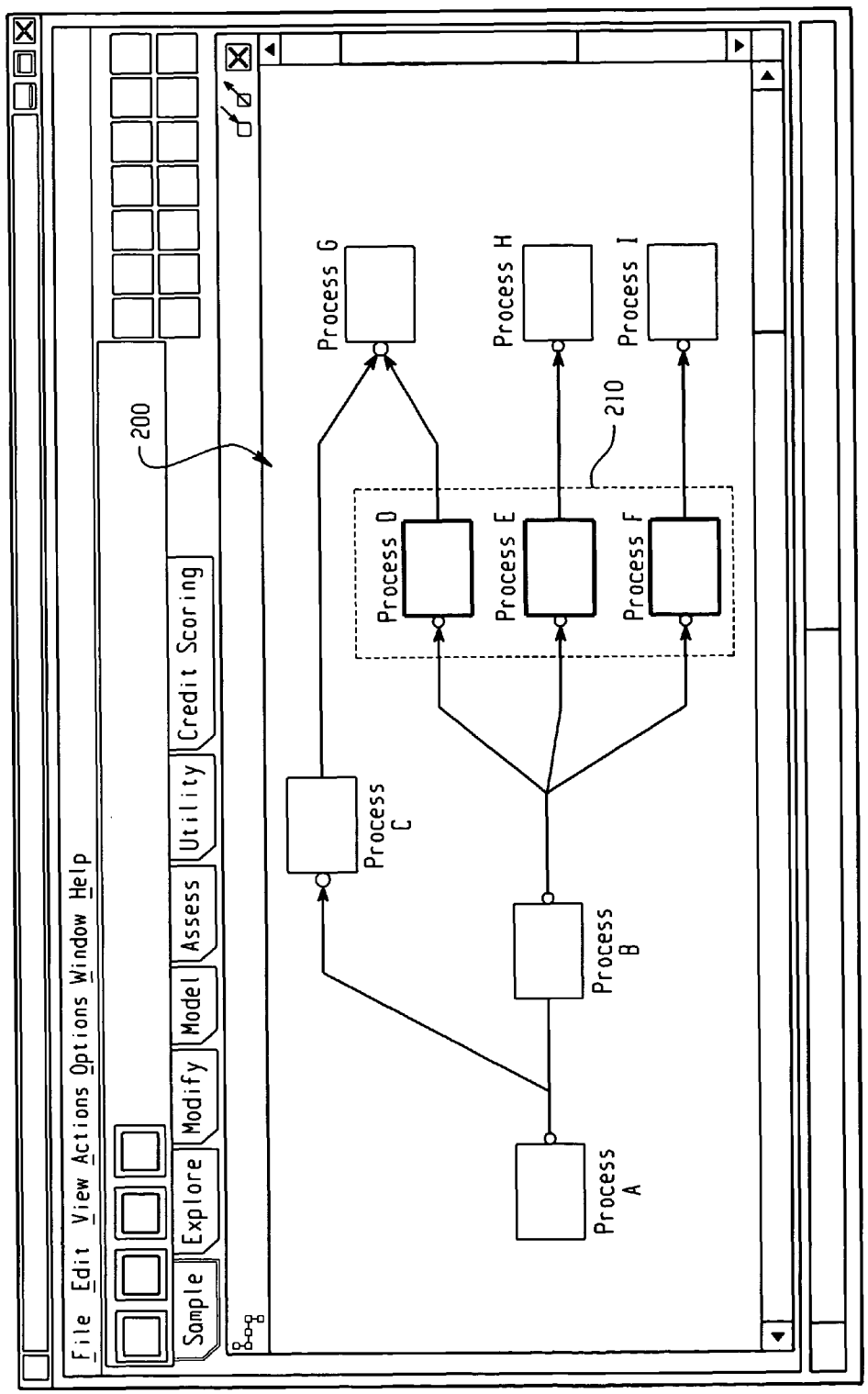
FIG. 6 depicts another example user interface for a process manager computer program.

FIG. 6 depicts another example user interface for a process manager computer program that identifies processes of a computer program that may be run in parallel in a multi-processor environment. Similar to FIG. 5, an interface region 200 is provided for displaying and modifying a process workflow diagram for a computer program. The example process flow shown in FIG. 6 includes numerous processes (Process A-Process I), which are executed in a non-linear manner. The interface 200 may be used to identify processes within the process workflow that may be run in parallel. For example, the three example processes (Processes D, E and F) shown within the dotted oval 210 may be run in parallel because they are each scheduled to occur after the execution of Process B. The user may thus identify these processes to be run in parallel using the interface 200. Then, when the process flow is executed, computer code is generated that instructs the computer program to attempt to run the identified processes (Processes D, E and F) in parallel using the multi-processor environment, for example as described above with reference to FIGS. 1-4.

This written description uses examples to disclose the invention, including the best mode, and also to enable a person skilled in the art to make and use the invention. The patentable scope of the invention may include other examples that occur to those skilled in the art.

It is further noted that the systems and methods described herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It is claimed:

1. A method of executing a computer program that performs multiple processes, comprising:
   before executing the computer program, identifying a plurality of the processes that are capable of being executed in parallel on separate processors and generating computer code that identifies the plurality of processes;
   upon executing the computer program on a client computer, accessing metadata to determine if a computer grid having multiple nodes is available to execute the identified plurality of processes, wherein the client computer is not part of the computer grid;
   if the computer grid is available, then using the computer code to cause the identified plurality of processes to be executed on the computer grid, the computer code enabling the computer program to execute the identified plurality of processes in parallel on the multiple nodes of the computer grid;
   if the computer grid is not available, then determining if a multi-processor computer is available to execute the identified plurality of processes, and if so, then executing the identified plurality of processes in parallel using the multi-processor computer, wherein the multi-processor computer is not part of the computer grid;
   wherein the identified plurality of processes are executed sequentially on the client computer if neither the computer grid nor the multi-processor computer are available.

2. The method of claim 1, wherein at least one of the multiple processes is executed using the client computer and other ones of the multiple processes are executed on the computer grid based on resources available on the computer grid.

3. The method of claim 1, wherein the computer code identifies the plurality of processes that are capable of being executed in parallel without identifying any specific resources on which to execute the plurality of processes.

4. The method of claim 1, further comprising:
   asynchronously aggregating data results from the execution of the identified plurality of processes on the grid computer.

5. The method of claim 4, further comprising:
   synchronizing the aggregated data results; and
   providing the synchronized data results to one or more of the multiple processes that are executed subsequent to the identified plurality of processes.

6. The method of claim 1, wherein the computer code is added to the computer program.

7. The method of claim 1, wherein the two or more processes are identified in a process workflow.

8. The method of claim 7, further comprising:
   generating the process workflow using a process manager computer program.

9. The method of claim 8, wherein the process manager computer program is part of the computer program that performs the plurality of processes.

10. The method of claim 9, wherein the process manager computer program operates independently of the computer program and generates the computer code that is used by the computer program to identify the plurality of processes that may be run in parallel.

11. The method of claim 1, further comprising:
    determining nodes of the computer grid that are available to execute the identified plurality of processes.

12. The method of claim 11, further comprising:
    if an insufficient number of nodes are available to execute all of the identified plurality of processes in parallel, then causing less than all of the identified plurality of processes to be executed in parallel on the computer grid.

13. The method of claim 1, further comprising:
    identifying a computer to execute one of the multiple processes; and
    causing the one of the multiple processes to be executed on the identified computer.

14. A system for executing a computer program that performs multiple processes, comprising:
    a client computer that executes a process manager software application for generating computer instructions that identify a plurality of the processes that may be run in parallel on separate nodes of a computer grid, wherein the client computer is not part of the computer grid; and
    a metadata server for storing metadata that identifies whether the computer grid is available to execute the plurality of processes;
    the computer program being stored on a computer-readable medium and being configured to execute on the client computer, and when executed by the client computer causing the client computer to query the metadata server to determine if the computer grid is available to execute the plurality of processes;
    if the computer grid is available to execute the plurality of processes, the computer program being configured to use the computer instructions to cause the plurality of processes to be executed on the computer grid, the computer instructions enabling the computer program to execute the plurality of processes in parallel on the separate nodes of the computer grid;
    wherein the computer program is configured to cause the client computer to determine if a multi-processor computer not part of the computer grid is available to execute the plurality of processes if the computer grid is not available, and
    wherein the computer program is further configured to cause the multi-processor computer to execute the plurality of processes in parallel if the computer grid is not available, wherein the client computer executes the plurality of processes sequentially if neither the computer grid nor the multi-processor computer are available.

15. The system of claim 14, wherein the process manager software application provides a user interface for receiving user commands to generate the computer instructions.

16. The system of claim 14, wherein the process manager software application is part of the computer program.

17. The system of claim 14, wherein the process manager software application is part of a separate computer program that operates independently of the computer.

* * * * *